United States Patent [19]

Pelto-Huikko et al.

[11] Patent Number: 4,553,610
[45] Date of Patent: Nov. 19, 1985

[54] HYDRAULIC STRIKING MACHINE

[75] Inventors: Raimo K. Pelto-Huikko, Helsinki; Esko A. O. Åhlman; Pertti V. Rautimo, both of Salpakangas, all of Finland

[73] Assignee: Kone Oy, Helsinki, Finland

[21] Appl. No.: 588,947

[22] Filed: Mar. 13, 1984

Related U.S. Application Data

[63] Continuation of Ser. No. 179,658, Aug. 20, 1980, abandoned.

[30] Foreign Application Priority Data

Aug. 21, 1979 [FI] Finland .................................. 792591

[51] Int. Cl.$^4$ .............................................. E21B 7/00
[52] U.S. Cl. ......................................... 173/1; 173/58; 173/76; 173/138
[58] Field of Search ....................... 173/58, 72, 76, 79, 173/90, 138; 175/21, 84, 100; 92/80, 87, 82, 78; 417/568; 188/313, 318

[56] References Cited

U.S. PATENT DOCUMENTS

| 1,293,081 | 2/1919 | Gilman | 173/138 X |
| 1,424,188 | 8/1922 | Smith | 173/138 |
| 2,337,351 | 12/1943 | Schorer | 173/138 |
| 2,559,659 | 7/1951 | Redman | 417/568 |
| 4,259,895 | 4/1981 | Owens | 92/78 |

FOREIGN PATENT DOCUMENTS 316184 12/1919 Fed. Rep. of Germany .......... 92/87

Primary Examiner—James M. Meister
Assistant Examiner—John L. Knoble
Attorney, Agent, or Firm—Martin Smolowitz

[57] ABSTRACT

Improvement to a hydraulic striking machine including among other things a body part and a piston, moving to and fro in the body and being accelerated to strike against a tool. The air current produced is led out of the machine uniformly along the surface of the tool to clean the tool.

7 Claims, 1 Drawing Figure

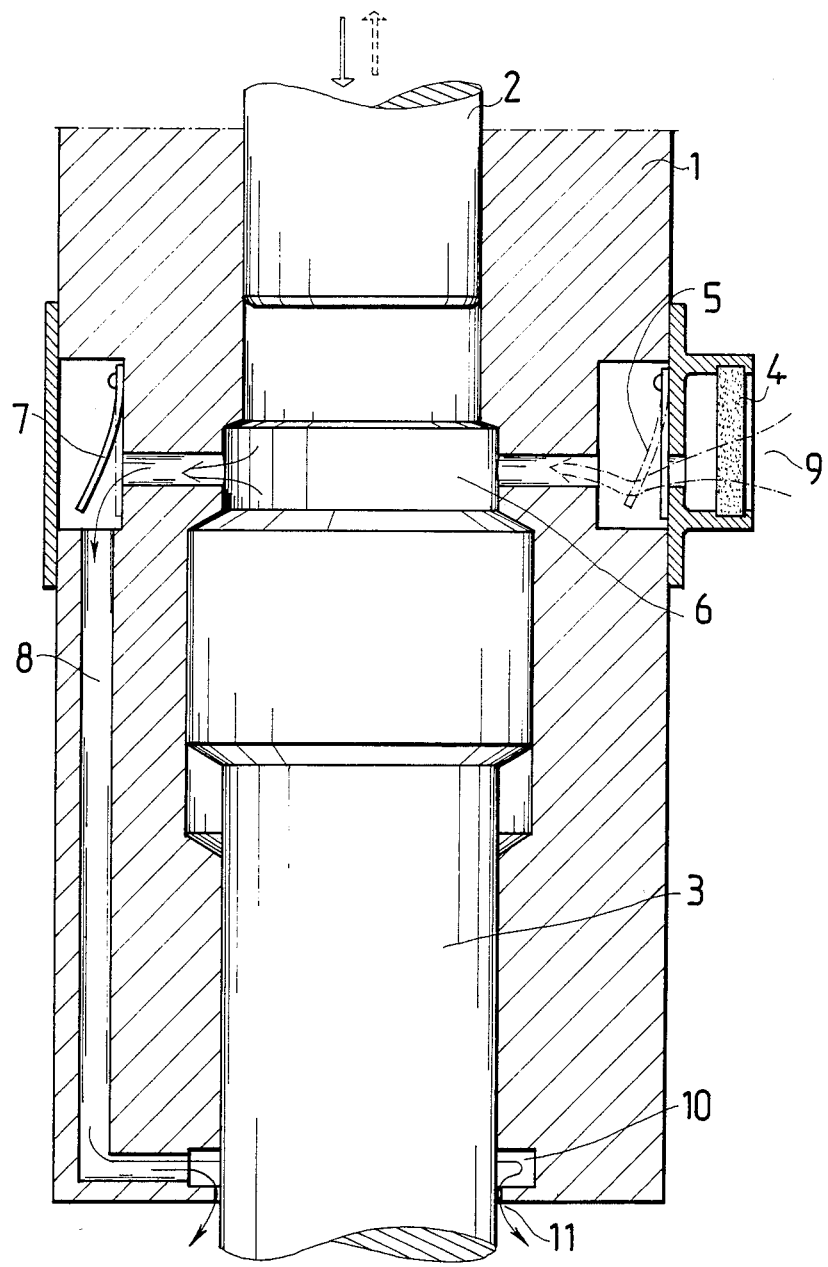

HYDRAULIC STRIKING MACHINE

This is a continuation of application Ser. No. 179,658 filed Aug. 20, 1980, now abandoned.

BACKGROUND OF INVENTION

This invention provides an the improvement to a hydraulic striking machine, including among other things a body part and a piston moving to and fro in the body and being accelerated to strike against a tool wherein the tool surface is cleaned by a current of air flowing along the tool.

When working takes place in dusty circumstances or conditions, where many impurities, e.g. small sand particles, exist in the air, the striking machines presently in general use often become targets of abrasive wearing. Very often, when for instance stones or concrete are crushed, dust and other small loose stone particles can penetrate between the tool and its pilot surface causing both additional noise and rapid wearing of rubbing surfaces. The abrasive influence of the loose material is still worsened by the fact that small oil leakages take place often in hydraulic striking machines, due to which the tool surface is covered by an oil layer. The abrasive dirt can easily stick to this oil layer. It is evident, that the service and maintenance costs of striking machines are then high.

DESCRIPTION OF INVENTION

The object of this invention is to eliminate the drawbacks mentioned before and to achieve a reliable and safely running striking machine, the service and maintenance of which costs concerning the tool wearing are essentially lower than the corresponding costs in present striking machines.

The striking machine according to the invention is characterized by that an air current is produced in an impact compression space between a reciprocating piston and an impact tool and is led out of the machine along the tool surface. The advantage is that wearing of the tool caused by dust and other small particles can be prevented and the pilot surfaces of the tool can be kept clean.

The striking machine according to an advantageously adaptable form is characterized by that the puffing air discharged from the impact compression space between the piston and the tool is led along the tool surface. The advantage is that a cheap and simple construction is achieved. In this case for example no outer power source is needed to produce the air current for cleaning the tool outer surface.

The striking machine according to another advantageously adaptable form is characterized by that the air current is led out of the machine along the tool surface through a ring-shaped nozzle. This is advantageous among other things because a uniform air current is provided surrounding the tool, so that the cleaning effect is the same in different sizes of the tool.

The invention will be further described in the following example with reference to the enclosed FIGURE, showing one longitudinal section of the striking machine according to the invention.

As shown in FIG. 1, the striking machine has a body part 1, in the space inside which moves a hydraulically operated piston 2 to and fro intermittently striking a tool 3 having upper end 3a, through which tool striking energy is transferred to the working object. When the piston 2 rises upwards after a strike, an atmospheric air current 9 penetrates through the filter 4 and inlet check valve 5 to the impact or compression space 6. When the piston 2 comes down for the new strike on tool end 3a, it pushes air in front of it through the outlet check valve 7 to the channel 8. The valve 5 closes and prevents the access of air back to the space outside the striking machine. From the channel 8 air current is led to the annular space 10 around surface 12 of the tool the tool, from which space air goes away through the ring-shaped nozzle 11.

To anyone familiar with the field it is clear that the invention is not restricted only to the example shown above, but that the adaptable forms of the invention may vary as presented in the patent claims shown afterwards.

We claim:

1. A method for operating a hydraulic-actuated striking machine comprising a body part and a hydraulically operated piston moving to and for in the body, with said piston being accelerated to strike intermittently against a tool, wherein the improvement comprises:
   (a) passing a current of air directly from the atmosphere through a filter then through an inlet check valve into an impact compression space located between the piston and the tool to provide an intermittent puffing air current; and
   (b) leading the air current from said impact compression space through an outlet check valve and then uniformly along the outer surface of said tool to clean the tool.

2. A method for operating a hydraulic actuated striking machine comprising a body part and a hydraulically operated piston moving to and fro in the body and said piston being accelerated to strike intermittently against a tool, wherein the improvement comprises passing a current of air directly from the atmosphere through an impact space located between the piston and the tool to provide an intermittent puffing air current, and leading the puffing air current out of the impact space of the machine and uniformly along the outer surface of said tool to clean the tool.

3. A method for operating a striking machine according to claim 2 wherein the current of air to said impact compression space is passed first through a filter, then through an inlet check valve upstream of the impact space.

4. A method for operating a striking machine according to claim 2, wherein the current of puffing air from said impact compression space is passed through an outlet check valve and then through a channel leading to the outer surface of the tool.

5. A hydraulic operated striking machine comprising a body part and a hydraulically operated reciprocating piston moving to and fro in the body and being accelerated to strike intermittently against a tool, wherein the improvement comprises valve means for intermittently admitting air directly from the atmosphere to an impact compression space located between the piston and the tool to provide an intermittent current of puffing air by action of the piston intermittently displacing air within an impact space located between the piston and the tool while striking the tool; and channel means for leading the resulting puffing air current out of the machine through a ring-shaped nozzle and uniformly along the surface of the tool to clean the tool.

6. A hydraulic striking machine comprising a body part and a hydraulically operated piston moving to and fro in the body and being accelerated to strike against a tool, wherein the improvement comprises inlet and outlet valve means arranged for passing an air current directly from the atmosphere through an impact compression space located between the piston and the tool so as to provide an intermittent current of puffing air displaced within an impact space located between the piston and the tool; filter means through which the air current is passed upstream of said inlet valve means; and channel means leading to an annular space around the tool, whereby the air current is led out of the machine uniformly along the surface of the tool.

7. A striking machine according to claim 6, characterized in that the air current from said channel means is led out of the machine uniformly through a ring-shaped nozzle and along the surface of the tool.

* * * * *